Dec. 20, 1966    D. C. KREBS ET AL    3,292,825
MEASURING DISPENSER

Filed Feb. 8, 1965    2 Sheets-Sheet 1

INVENTORS
DONALD C. KREBS
BY CLARENCE R. WEISFLOG

Cyril M. Hajewski
ATTORNEY

Dec. 20, 1966   D. C. KREBS ET AL   3,292,825
MEASURING DISPENSER
Filed Feb. 8, 1965   2 Sheets-Sheet 2
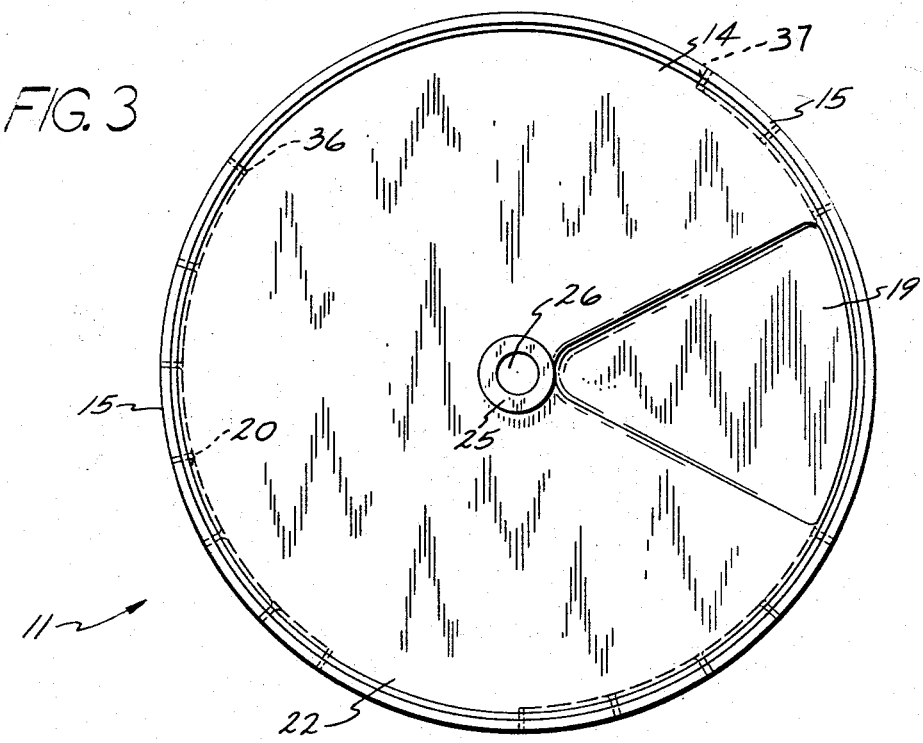
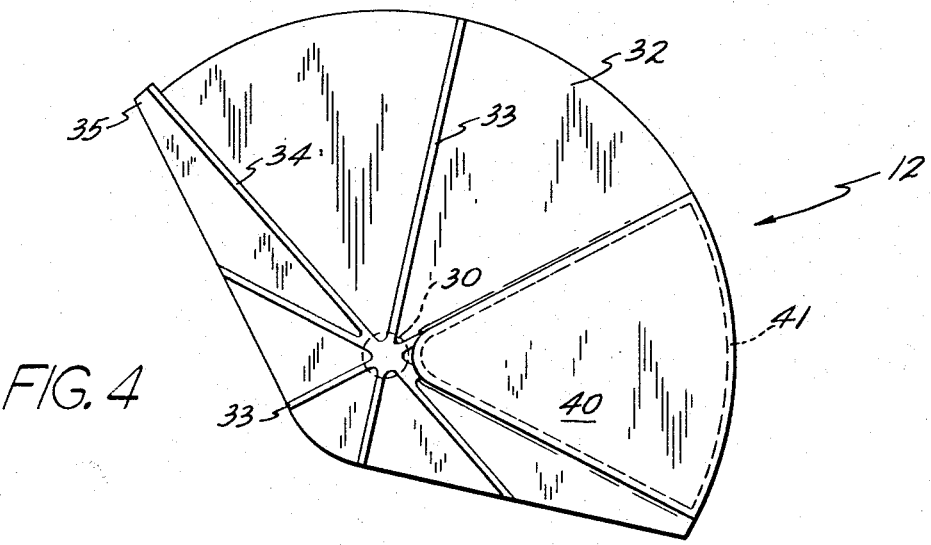
INVENTORS
DONALD C. KREBS
BY CLARENCE R. WEISFLOG
Cyril M. Hajewski
ATTORNEY

United States Patent Office 3,292,825
Patented Dec. 20, 1966

3,292,825
MEASURING DISPENSER
Donald C. Krebs, 6925 W. Villard Ave., Milwaukee, Wis. 53218, and Clarence R. Weisflog, Lisbon, Wis. (W226 N6034 Avon Court, Sussex, Wis. 53089)
Filed Feb. 8, 1965, Ser. No. 431,017
7 Claims. (Cl. 222—362)

This invention relates generally to dispensers for powdered or granulated materials and more particularly to dispensers that are attachable to the container in which the material is marketed for dispensing the material in measured quantities directly from the container.

A number of powdered and granulated products are merchandised in containers that hold substantial quantities and the ultimate consumer removes the item from the container in measured amounts. A typical example is coffee which is most frequently sold to the consumer in the ground state so that it is ready to be used for producing the beverage. Such ground coffee is sold in a sealed container to retain its flavor and the most popular containers for such use are glass jars or metal cans. When the beverage is about to be brewed, measured amounts of the coffee are removed from the container and placed in the coffee maker. In order to make a quality beverage, the amount of ground coffee that is utilized in brewing the beverage should be measured with a reasonable amount of accuracy. However, it often happens that suitable measuring equipment is not immediately available so the person brewing the coffee guesses at the amount of ground coffee placed in the coffee maker. This may result in appreciable inaccuracies and disappointing results. Such failures could be avoided by providing suitable equipment mounted on the container for measuring the coffee removed from the container.

It is therefore a general object of the present invention to provide an improved apparatus for measuring powdered or granulated material as it is removed from its container.

Another object is to provide an improved dispenser for dispensing measured amounts of powdered or granulated material from the container in which the material is merchandised.

Another object is to provide a measuring dispenser that may be readily attached to the container in which the material to be dispensed is contained with the dispenser replacing the cover of the container.

Another object is to provide a measuring dispenser that also serves as the closure for the container in which the material to be dispensed is packed.

Another object is to provide a measuring dispenser that may be assembled in a few moments without the use of any tools.

A further object is to provide a dispenser for dispensing measured amounts of material from a container in which the dispenser assembly is formed of only two members.

A further object is to provide a measuring dispenser of simple and inexpensive but sturdy construction which is extremely efficient in operation.

According to this invention the improved measuring dispenser is designed to dispense the material directly from the container in which it is packed for distribution to the consumer. To this end the dispenser is adapted to be operatively attached to such container. The dispenser assembly comprises a cap member and a rotary control member which regulates the passage of the material being dispensed through an opening provided in the cap.

The cap member replaces the removable cover of the container in which the material is purchased by the consumer and is provided with an opening for the passage of the material out of the container. The rotary control member is assembled to the cap for rotation relative thereto and includes a measuring cup that has its interior completely enclosed except when it is alined with an opening at a discharge station. The rotary control member normally closes the opening in the cap for precluding the passage of material through it. However, the control member may be rotated to move the cup into communication with the opening in the cap to admit a flow of the material through the opening and into the cup which will then receive a predetermined quantity of the material. The control member is then rotated to reclose the opening in the cap and move the cup to the discharge station where the material can be poured out of the measuring cup.

The foregoing and other objects of this invention which will become more fully apparent from the following detailed description of an embodiment thereof may be achieved by the apparatus herein described by way of example in connection with the illustration of its structural components in the accompanying drawings, in which:

FIGURE 3 is a plan view of the cap member that is shown coupled to the container in FIGURES 1 and 2; and FIGURE 4 is a bottom view of the rotary control member that is shown assembled to the cap member in FIGURES 1 and 2.

Figure 1:
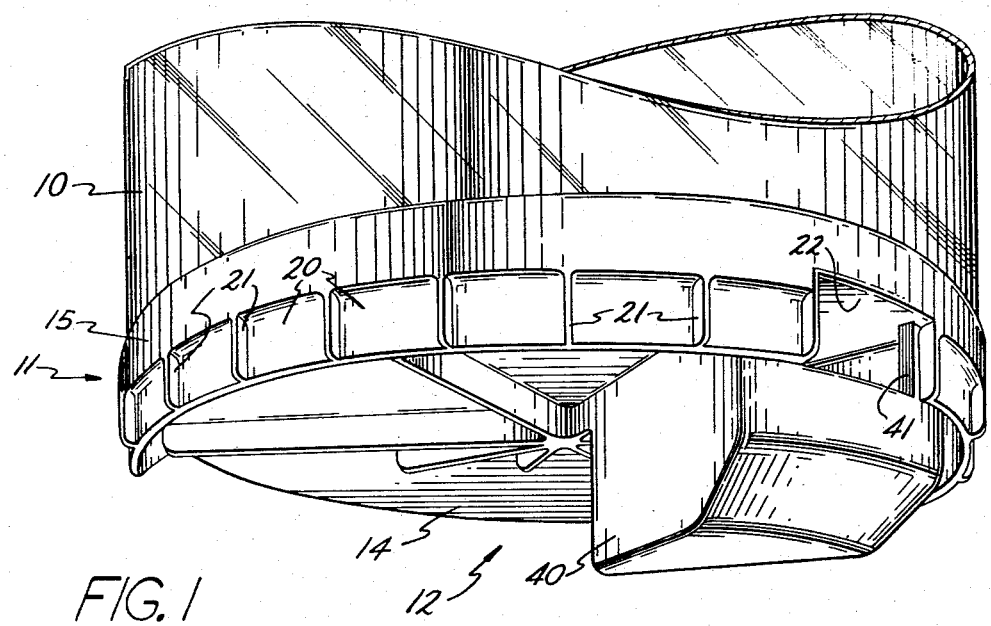
FIGURE 1 is a perspective view illustrating a measuring dispenser incorporating the features of the present invention, and shown attached over the opening of the container in which the material to be dispensed is packaged.

Reference is now made more particularly to the drawings and specifically to FIG. 1 thereof which illustrates a measuring dispenser incorporating the features of the present invention attached to a container. The dispenser of the present invention is well adapted for dispensing any powdered or granulated material from a container, but for the purposes of this description it will be assumed that the dispenser is attached to a coffee can 10 for dispensing ground coffee from the can in which it is marketed and sold at retail to the ultimate consumer. The coffee is packaged in the conventional can with no changes in its construction. The consumer opens the can in the usual manner and removes the cover that was applied to the can. The dispenser of the present invention is then mounted on the can in place of its original cover so that it serves both as a cover for enclosing the contents within the can as well as a dispenser for dispensing the contents in measured amounts. Of course, the dimensions of the dispenser correspond to the dimensions of the container to which it is to be applied, and when a different size container is employed, the size of the dispenser must be adapted accordingly to accommodate the size of the container. In FIG. 1 the coffee can 10 is illustrated in its inverted position with its opening facing downwardly so that the ground coffee in the can 10 will drop by gravity into the dispenser. The latter comprises a cap 11 and a rotary control member 12.

Figure 2:
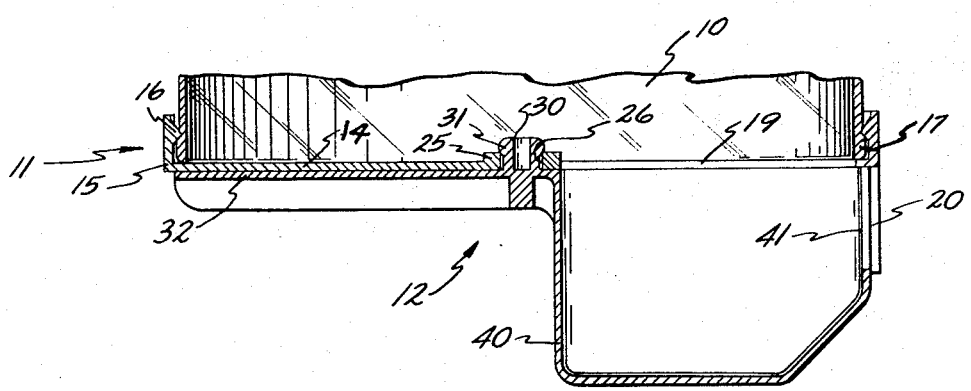
FIGURE 2 is a view in vertical section taken through the center of the dispenser depicted in FIGURE 1.

The cap 11 is applied directly to the can 10 over the opening from which the cover of the can has been removed so that the dispenser serves as a closure as well as a dispenser. To this end, the cap 11 includes a disk 14 that has an upwardly extending continuous peripheral flange 15 which encompasses the entire periphery of the circular can 10 adjacent to its opening. As shown in FIGURE 2, the interior of the peripheral flange 15 is provided with an annular protrusion 16 which engages a rib 17 formed on the can 10. The containers in which the granulated or powdered materials are packaged are usually provided with a peripheral rib or thread adjacent to the opening of the container, and the annular protrusion 16 is provided for engaging such thread or ribs to retain the cap 11 attached to the container. Accordingly, the flange 15 encompasses the periphery of the can 10 adjacent to the opening of the can to hold the disk 14 over the opening of the can. The can is thus closed except for a triangular opening 19 formed in a segment of the disk 14 for admitting the gravitational passage of the ground coffee from the can 10 into the dispenser as will be later described. This opening 19 serves as a loading station for loading the material from the container into the dispenser.

The cap 11 also includes a depending flange 20 that extends partially about the disk 14. The flange 20 is concentric with the disk 14 with its arcuate configuration extending about a radius that is slightly smaller than the radius of the circle formed by the flange 15. The reduced diameter of the depending flange 20 serves to recess it from the periphery of the flange 15 to enable a plurality of ribs 21 to be molded integrally with the flange 20 and extend therefrom radially to the periphery of the flange 15. The reduced radius of the flange 20 relative to the flange 15 is clearly shown in the top view of the cap 11 in FIGURE 3. Since the flange 20 depends from the disk 14 along a radius that is smaller that the radius of the flange 15, the flange 20 is depicted by the broken lines while the flange 15 is illustrated by the solid lines extending completely about the periphery of the disk 14. Moreover, the depending flange 20 is interrupted by an opening 22 which is provided for discharging the material from the dispenser in a manner to be later described. The opening 22 serves as an unloading station through which the material is unloaded from the dispenser.

The cap 11 further includes a concentric boss 25 having a central hole 26 as clearly shown in FIGS. 2 and 3. The hole 26 is provided for receiving a concentric projection 30 that couples the rotary control member 12 to the cap 11 while permitting the rotary control member 12 to rotate relative to the cap 11. Although the projection 30 fits rather loosely into the hole 26 to facilitate rotation of the rotary control member 12 relative to the cap 11, the projection 30 is provided with an annular enlargement or flange 31 of greater diameter than the hole 26. The dispenser is molded of a flexible material to enable the projection 30 and its associated flange 31 to be forced through the hole 26. As the flange 31 is being forced therethrough, the hole 26 is expanded while the flange 31 is compressed, and as the flange 31 passes through the hole 26, the parts return to their normal configuration so that the enlarged flange 31 retains the projection 30 in the hole 26 for securely coupling the rotary control member 12 to the cap 11.

The rotary control member 12 comprises a plate 32 which is formed in the shape of a segment of a circle as depicted in FIG. 4 which is a view of the bottom of the rotary control member 12 illustrated in FIG. 2. A plurality of ribs 33 extend outwardly from the bottom face of the plate 32 to provide rigidity thereto. Another rib 34 is slightly longer than the ribs 33 so that it extends beyond the periphery of the plate 32 with a portion 35 of the plate 32 also extending with the rib 34 beyond the periphery of the plate 32. The rib 34 and plate extension 35 serve as abutments to engage the ends 36 and 37 of the depending flange 20 to limit the rotary movement of the control member 12 relative to the cap 11. Thus, when looking at the dispenser from the top, as the cap 11 is depicted in FIG. 3, the rib 34 will engage the end 36 of the flange 20 to limit the counter-clockwise rotation of the rotary control member 12. In like manner, the plate extension 35 will engage the end 37 of the flange 20 for limiting the clockwise rotation of the rotary control member 12 relative to the cap 11.

The rotary control member 12 also includes a measuring cup 40 having a predetermined capacity and being of triangular configuration in horizontal section and depending from the plate 32 of the rotary control member 12. The top of the cup 40 is open and this opening corresponds to the size and configuration of the opening 19 formed in the disk 14 of the cap 11. The cup 40 also includes a front opening 41 which is formed in the upper portion of the front of the measuring cup 40 and is of a height not greater than the height of the flange 20 so that the latter will close the opening 41 to prevent the escape of the contents of the cup 40 except when the opening 41 of the cup 40 is in registration with the opening 22 formed in the flange 20.

The plate 32 is heavily reinforced by the ribs 33 and 34 to prevent its flexure, and the projection 30 with its cooperating annular flange 31 retain the top face of the plate 32 in tight engagement with the bottom face of the disk 14. In order to obtain the necessary rigidity the plate 32 could be shaped into a spherical configuration in the form of a dome and its mating disk 14 would be shaped in a like manner to complement the spherical configuration of the plate 32. Such shaping of the plate 32 and disk 14 would impart the necessary rigidity and the ribs 33 and 34 could then be omitted. In any event, the plate 32 is in tight engagement with the bottom face of the disk 14 and thereby prevents the coffee in the can 10 from falling through the opening 19 formed in the disk 14 unless the cup 40 is moved into registration with the opening 19 in the manner illustrated in FIG. 2. Such registration is obtained by rotating the rotary control member 12 in a counterclockwise direction until the rib 34 engages the end 36 of the flange 20. The coffee will then flow by gravity from the can 10, through the triangular opening 19 into the cup 40. When the cup 40 is in this position, its front opening 41 is closed by the flange 20, as shown in FIG. 2, so that the cup 40 may be filled to capacity inasmuch as its contents cannot escape through the opening 41. The capacity of the cup 40 will be a desired amount, as for example, a capacity sufficient to hold enough coffee to produce two cups of the beverage.

When it is desired to dispense the coffee from the cup 40, the rotary control member 12 will be rotated in a clockwise direction, as viewed from the top, to its limit of movement as established by the abutment of the projection 35 against the end 37 of the flange 20. The cup 40 will then be positioned so that its front opening 41 registers with the opening 22 formed in the flange 20. The can 10 with the dispenser attached will then be tipped in a direction to cause the coffee to flow out of the cup 40 through the opening 41 into the desired receptacle. The flange 20 is heavily reinforced by the ribs 21 to prevent the outward flexure of the flange 20 so that its inner arcuate surface is maintained in tight engagement with the front of the cup 40 to prevent the escape of the contents of the cup 40 through its opening 41 until the latter is moved into engagement with the opening 22 of the flange. In order to refill the cup 40 with coffee from the can 10, the rotary control member 12 will be rotated in a counterclockwise direction until the rib 34 is returned into engagement with the end 36 of the flange 20. This again places the cup 40 in registration with the opening 19 of the cap 11 to permit the flow of coffee from the can 10 to refill the cup 40. The operation is then repeated in the manner previously described to dispense the contents of the cup 40.

From the foregoing detailed description of the illustrative embodiment of the present invention, it will be apparent that a new and improved measuring dispenser has been provided which is especially adapted to dispense powdered and granulated material from the container in which the material is marketed. Moreover, the improved dispenser is formed of an absolute minimum number of simple parts which can be readily assembled to the container in a matter of moments, and which is unusually inexpensive to produce and yet will operate with outstanding efficiency.

Although the illustrative embodiment of the invention has been described in considerable detail for the purpose of making a full disclosure of a practical operative arrangement by means of which the invention may be practiced, it is to be understood that various novel features of the invention may be incorporated in other arrangements without departing from the spirit and scope of the invention as defined in the subjoined claims.

The principles of the invention having now been fully explained in connection with the foregoing description of embodying structure, we hereby claim as our invention:

1. In an apparatus for dispensing material from a container having an opening; a cap attachable to the container over said opening, said cap having an opening to admit the flow of material out of the container; a control member movable relative to said cap and normally closing the opening in said cap for retaining the material in the container; and a cup secured to said control member for movement therewith so that said cup may be moved into registration with the opening in said cap for receiving and by itself retaining a quantity of the material from the container.

2. In an apparatus for dispensing material from a container having a mouth; a cap member attachable over the mouth of the container to serve as a closure therefor, said cap having an opening for admitting the passage of the material out of the container; a control member supported for rotation relative to said cap in position to normally close the opening in said cap for retaining the material in the container; and a cup mounted on said control member in position to be moved by the rotation of said control member into registration with the opening in said cup for receiving and by itself retaining the material passing through the opening, said cup having a side opening through which the material may be subsequently dispensed from said cup.

3. In an apparatus for dispensing material from a container having a mouth; a disk having an opening; means securing said disk over the mouth of the container to confine the material in the container except for passage through the opening in said disk; a plate supported for movement relative to said disk for selectively stopping the opening in said disk to prevent the escape of material from the container; a cup having a top filler opening and a side discharge opening, said cup being carried by said plate in position to be moved with said plate so that its filler opening is moved into communication with the opening in said disk as the plate moves out of registration with the opening to cause the material from the container to flow through the opening in said disk into said cup through its filler opening to be retained by said cup independently of any other structure; and a flange depending from said disk to overlie the discharge opening of said cup to prevent the escape of the material from said cup, said flange having an opening, whereby said plate may be moved to shift the discharge opening of said cup into registration with the opening in said flange to enable the contents of said cup to be poured out of the cup through its discharge opening.

4. In an apparatus for dispensing material from a container having a mouth; a cap member attachable over the mouth of the container to serve as a closure therefor, said cap having an opening at a loading station and a passage at a discharge station; and a cup supported by said cap for movement between said loading station and said discharge station so that said cup may be loaded at said loading station by the passage of the material through the opening in the cap into said cup for retention by said cup itself, and the latter may be emptied at said discharge station by the passage of the material from said cup through the passage in said cap at the discharge station.

5. In an apparatus for dispensing material from a container having a mouth; a cap member attachable over the mouth of the container to serve as a closure therefor, said cap having an opening for admitting the flow of the material out of the container and having a passage; a cup supported by said cap for movement between the opening and the passage in said cap, said cup being loaded by the flow of the material through the opening in said cap for retaining the material by itself and being unloaded by moving it into registration with the passage in said cap to enable the material to flow out of the cup through the passage; and means for closing the opening in said cap to retain the material in the container, said means being rendered inoperative by the movement of said cup into registration with the opening to permit the flow of the material into the cup.

6. In an apparatus for dispensing material from a container having a mouth; a disk having a concentric resiliently extensible hole and a discharge opening; means for securing said disk over the mouth of the container to confine the material in the container except for passage through the discharge opening in said disk; a plate disposed over the opening in said disk for preventing the passage of the material therethrough; a projection extending from said plate and passing through the concentric hole of said disk to render said plate rotatable relative to said disk; an enlargement on the extending end of said projection said enlargement being of greater diameter than the concentric hole in said disk and being resiliently compressible so that it may be forced through the extensible concentric hole of said disk for retaining said plate in rotatable operating relationship relative to said disk; and a cup carried by said plate in position to be moved with the rotation of said plate into registration with the opening in said disk to receive and by itself retain the material passing through the opening in said disk, said cup having a side discharge opening through which material in said cup may be dispensed.

7. An apparatus for dispensing material according to claim 6 including; a flange depending from said disk to overlie the discharge opening of said cup to prevent the escape of material from said cup, said flange having an opening whereby said plate may be rotated relative to said disk to shift the discharge opening of said cup into registration with the opening in said flange to enable the contents of said cup to be poured out of the cup through its discharge opening and through the opening in said flange.

References Cited by the Examiner

UNITED STATES PATENTS

| 2,730,272 | 1/1956 | Ellis | 222—362 |
| 3,129,853 | 4/1965 | Hoskins | 222—362 X |

References Cited by the Applicant

UNITED STATES PATENTS

| 527,329 | 10/1894 | Foster. |
| 2,399,016 | 4/1946 | Gits. |
| 2,579,388 | 12/1951 | Lowry. |
| 2,584,781 | 2/1952 | Beatty. |
| 2,760,688 | 8/1956 | Packwood. |
| 2,944,707 | 7/1960 | Steinmetz. |
| 3,007,612 | 11/1961 | Tepper. |

ROBERT B. REEVES, *Primary Examiner.*

HADD S. LANE, *Examiner.*